United States Patent
Chin et al.

(10) Patent No.: US 10,554,293 B1
(45) Date of Patent: Feb. 4, 2020

(54) SATELLITE OPERATION OF NARROWBAND INTERNET OF THINGS RADIO PROTOCOL

(71) Applicants: Michael Chin, Germantown, MD (US); William Whitmarsh, Germantown, MD (US)

(72) Inventors: Michael Chin, Germantown, MD (US); William Whitmarsh, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/371,886

(22) Filed: Apr. 1, 2019

Related U.S. Application Data (60) Provisional application No. 62/767,659, filed on Nov. 15, 2018.

(51) Int. Cl.
*H04W 74/08* (2009.01)
*H04W 72/04* (2009.01)
(Continued)

(52) U.S. Cl.
CPC ..... *H04B 7/18528* (2013.01); *H04L 27/2657* (2013.01); *H04L 43/0864* (2013.01); *H04W 74/0833* (2013.01)

(58) Field of Classification Search
CPC .............. H04L 5/0048; H04L 5/0053; H04W 56/0035; H04W 56/0055; H04W 74/08; H04W 74/0833
(Continued)

(56) References Cited

U.S. PATENT DOCUMENTS

2018/0139025 A1* 5/2018 Rico Alvarino ...... H04L 5/0053
2018/0145802 A1* 5/2018 Hwang ................. H04W 72/04
(Continued)

*Primary Examiner* — Tan H Trinh
(74) *Attorney, Agent, or Firm* — Capitol City TechLaw; Jasbir Singh (57) ABSTRACT

The present teachings disclose implementations of a UE and a method for providing a Narrowband Internet of Things (NB-IoT) network, the method including: receiving an NB-IoT downlink over a forward link; obtaining MAC configuration parameters, a transmit-timing offset and a transmit-frequency offset; pre-adjusting, to align with a return link timing and a return link frequency, a transmit-timing with the transmit-timing offset and a transmit-frequency with the transmit-frequency offset; requesting, based on the MAC configuration parameters and after the pre-adjusting, a connection with a Random-Access Preamble (RAR) over an NB-IoT uplink via the return link; and establishing the connection upon receiving a Random-Access Response (RAR), where a Round Trip-Time (RTT) from a transmitting antenna to a receiving antenna is greater than 67 microseconds (us), and both the NB-IoT downlink and the NB-IoT uplink use a mostly unchanged NB-IoT standard waveform. The NB-IoT service may be relayed by a satellite, for example, a geosynchronous earth orbit satellite. Further corrections to the timing and frequency may be performed on the connection. A cell or beam selection may be based on an NB-IoT system type, including NB-IoT over satellite, indicated in a Master Information Block.

20 Claims, 4 Drawing Sheets

(51) Int. Cl.
*H04L 5/00* (2006.01)
*H04W 56/00* (2009.01)
*H04B 7/185* (2006.01)
*H04L 12/26* (2006.01)
*H04L 27/26* (2006.01)

(58) Field of Classification Search
USPC ... 455/7, 11.1, 12.1, 13.4, 41.1, 41.2, 67.11, 455/67.16, 522
See application file for complete search history.

(56) References Cited

U.S. PATENT DOCUMENTS

| | | | |
|---|---|---|---|
| 2018/0249509 A1* | 8/2018 | Yi | H04J 11/0069 |
| 2018/0287846 A1* | 10/2018 | Kim | H04W 4/70 |
| 2018/0367278 A1* | 12/2018 | Chatterjee | H04W 4/70 |
| 2018/0368181 A1* | 12/2018 | Lee | H04W 74/08 |
| 2019/0245657 A1* | 8/2019 | Lee | H04L 1/18 |
| 2019/0268949 A1* | 8/2019 | Menon | H04W 24/10 |

* cited by examiner

SATELLITE OPERATION OF NARROWBAND INTERNET OF THINGS RADIO PROTOCOL

FIELD

Satellite operation of narrowband-Internet of Things (NB-IoT) for a terrestrial Low Power Wide Area (LPWA) network is disclosed. Satellite based NB-IoT provides narrowband channels, deep signal penetration, and high latency.

BACKGROUND

Terrestrial Narrowband-IoT (NB-IoT) is a 3rd Generation Partnership Project (3GPP) wireless standard for terrestrial Low Power Wide Area (LPWA) networks. Terrestrial NB-IoT provides a downlink speed of 250 kilobits per second (kbps), an uplink speed of 50 kbps, a relaxed latency of up to 10 seconds, a maximum distance from a UE to an eNodeB antenna is 100 km or less having a maximum Round Trip-Time (RTT) of 67 microseconds (us), a stationary eNodeB antenna and a UE antenna that may be mobile. Moreover, terrestrial NB-IoT provides a +20 dB link margin over GSM and LTE, and IP Data over the control plane. The 3GPP NB-IoT radio protocol is inoperative when the RTT is greater than 67 microseconds due at least in part to the significantly more signal propagation delay and frequency Doppler shifts experienced due to relaying a signal, for example, when the signal is relayed by a satellite or a high attitude platform.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Satellite NB-IoT needs to be adapted for higher latency, for example, a GEO satellite has a one-way 240-280 millisecond (ms) satellite delay or a 480-540 ms round trip delay. In some embodiments, a higher link budget is disclosed to account for the farther propagation distance. In some embodiments, a system type information field may be added in to a Master Information Block (MIB) to indicate NB-IoT over satellite such that a user element (UE) can perform early compatibility detection during a cell search or beam selection. In some embodiments, a satellite beam center timing and frequency offset may be broadcast in the system information blocks. In some embodiments, before transmission of the random-access preamble, precorrections for timing and frequency may be made. In some embodiments, a gateway or an enhanced node B (eNodeB) may respond with timing and frequency corrections to the UE in the random-access response. In some embodiments, related random-access timers may be updated to permit higher round trip times. In some embodiments, new timing and frequency correction message definitions may be added to maintain synchronization with the satellite. In some embodiments, throughput performance over the satellite may be improved by disabling Hybrid Automatic Repeat reQuest (HARQ) in NB-IoT and relying on Radio Link Control (RLC) Automatic Repeat reQuest (ARQ) for retransmission. In some embodiments, the uplink may use a BPSK/QPSK encoder (UL). In some embodiments, the downlink may use a tail biting convolutional code. In some embodiments, a Narrow-band Orthogonal Frequency Division Multiplexing (OFDM) operation with up to 12 15 kHz subcarriers may be used in the downlink and a 3.75 kHz/15 kHz subcarrier may be used in the uplink.

In one embodiment, an NB-IoT signal may be transferred via a satellite using the following operations:
A. UE receives forward link signal
B. UE receives MAC configuration parameters via the forward link from SIB
C. UE pre-adjusts transmit/forward link timing and frequency for beam center timing/frequency
D. UE transmits
E. UE receives RAR from eNB/NM Manager that has additional corrections for frequency/timing.
F. UE computes new timing/frequency offsets and applies these new values
G. UE transmits with new alignment/synchronization The present teachings transfer a mostly unchanged NB-IoT waveform using mostly unchanged NB-IoT standard procedures. The adaptation of the NB-IoT standard procedures includes:
A. Extend the return link/transmit-timing synchronization via transmission of transmit synchronization elements in the System Information and extend timing correction fields in the RAR and TA messages
B. Adjustment for satellite Doppler frequency shift with transmission of transmit-frequency pre-corrections in the SIB and addition of new encoded fields as well as new frequency correction message.
C. Maintain backwards compatibility with the existing standard.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for providing a Narrowband Internet of Things (NB-IoT) network, the method including: receiving an NB-IoT downlink over a forward link; obtaining MAC configuration parameters, a transmit-timing offset and a transmit-frequency offset; pre-adjusting, to align with a return link timing and a return link frequency, a transmit-timing with the transmit-timing offset and a transmit-frequency with the transmit-frequency offset; requesting, based on the MAC configuration parameters and after the pre-adjusting, a connection with a Random-Access Preamble (RAP) over an NB-IoT uplink via the return link; and establishing the connection upon receiving a Random-Access Response (RAR), where a Round Trip-Time (RTT) from a transmitting antenna to a receiving antenna is greater than 67 microseconds (us), and both the NB-IoT downlink and the NB-IoT uplink use a mostly unchanged NB-IoT standard waveform. Other embodiments of this aspect include corresponding computer systems, apparatus, and computer programs recorded on one or more computer storage devices, each configured to perform the actions of the methods.

Implementations may include one or more of the following features. The method where the RAR includes a further timing correction and a further frequency correction, and the establishing includes adjusting the transmit-timing with the further timing correction and the transmit-frequency with the further frequency correction. The method further including adjusting the transmit-timing with a further timing correction upon receiving a timing advance command. The method further including adjusting the transmit-frequency with a further frequency correction upon receiving a frequency correction command. The method where the obtaining includes calculating the transmit-timing offset and the transmit-frequency offset based on a user equipment location and ephemeris of a satellite or a high-altitude platform. The method where the obtaining includes calculating the transmit-frequency offset based on a frequency doppler shift. The method where the NB-IoT downlink includes the transmit-timing offset and the transmit-frequency offset. The method where the RTT is greater than 1 millisecond (ms). The method where the forward link and the return link are relayed by a satellite or a high-altitude platform. The method further including updating random-access timers associated with the RAR based on the RTT. The method further including disabling a MAC HARQ protocol for the connection. Implementations of the described techniques may include hardware, a method or process, or computer software on a computer-accessible medium.

One general aspect includes a user equipment (UE) to communicate via a narrowband internet of things (NB-IoT) network, the UE including: a UE forward receiver module to receive an NB-IoT downlink over a forward link; a UE synchronization module and a UE connection module. The UE synchronization module is configured to obtain MAC configuration parameters, a transmit-timing offset and a transmit-frequency offset, and to pre-adjust, to align with a return link timing and a return link frequency, a transmit-timing with the transmit-timing offset and a transmit-frequency with the transmit-frequency offset. The UE connection module is configured to request, based on the MAC configuration parameters and after the pre-adjusting, a connection with a random-access preamble (RAR) over an NB-IoT uplink via the return link, and to establish the connection upon receiving a random-access response (RAR). In the UE, a round trip-time (RTT) from a transmitting antenna to a receiving antenna is greater than 67 microseconds (us). In the UE, the forward link and the return link are relayed by a satellite or a high-altitude platform. In the UE, both the NB-IoT downlink and the NB-IoT uplink use a mostly unchanged NB-IoT standard waveform. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Figure 1:
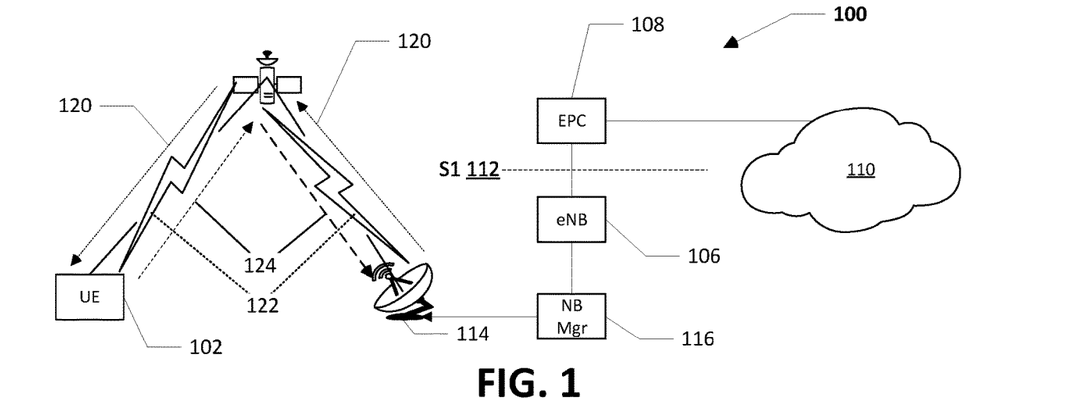
FIG. 1 illustrates a satellite NB-IoT system according to various embodiments.

FIG. 1 illustrates a satellite NB-IoT system according to various embodiments.

A satellite NB-IoT system 100 may include a UE 102 in communication with his satellite Gateway 114 via a satellite 104. The gateway 114 may be connected to an eNodeB 106 that interfaces with an Enhanced Packet Core (EPC) 108 over an S-1 interface 112. The EPC 108 may be connected to the Internet 110. A NB manager 116 may be connected to the gateway 114 to manage satellite communications between the UE 102 and the eNodeB 106. The NB manager 116 may provide an interface to the eNodeB 106 for satellite NB IoT communications to and from the UE 102. Communications between the UE 102 and the gateway 114 may be via radiofrequency communications. In some embodiments, the satellite 104 may be a Geosynchronous Earth Orbit (GEO) satellite, a middle Earth Orbit (MEO) satellite, a low earth orbit (LEO) satellite, or a High-Altitude Platform (HAP).

A NB-IoT signal 122 may be communicated between the UE 102 and the gateway 114 via a forward link 120 (from the gateway 114 to the UE 102) and a return link 124 (from the UE 102 to the gateway 114). One or both of the forward link 120 and the return link 124 may be a satellite beam. An antenna (not shown) may be disposed in the UE 102 for transmitting and receiving an RF signal. An antenna (not shown) may be disposed in the gateway 114 for transmitting and receiving an RF signal.

Figure 2:
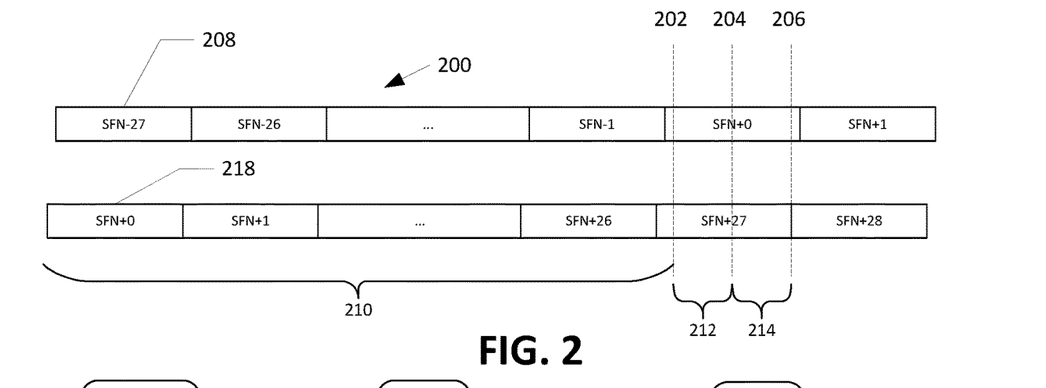
FIG. 2 illustrates a UE transmit synchronization to an eNB return link timing according to various embodiments.

FIG. 2 illustrates a UE transmit synchronization to the eNB return link timing according to various embodiments.

A UE transmit synchronization to the eNB return link timing diagram 200 illustrates a received signal 208 at time N including frames received by a UE, and a synchronized transmit signal 218 including frames transmitted by the UE, when the satellite NB-IoT is being relayed by a GEO satellite. In some embodiments, synchronization to a beam center provides the UE with sufficient information derived, for example, from satellite ephemeris and a System Information Block (SIB) to align to the beam center return link timing and frequency. The alignment to the beam center timing may be used to constrain a search window for the RAP and a total transmit offset correction that may be encoded in the RAR. The synchronized transmit signal 218 needs to be transmitted at a transmit-timing offset 210. The transmit-timing offset 210 needs to account for a RACH timing after correction 202, a beam center timing 204 and a maximum timing offset 206. In exemplary FIG. 2, the maximum timing offset 206 is offset by 28 frames or time N+28 frames, where 28 frames is the maximum transmit timing offset relative to the receive timing for a GEO satellite system. $N_{1A}$ 212 may be defined as the difference between the RACH timing after correction 202 and 204. The UE transmits the RAP with its return link timing aligned to the beam center timing 204. The NB Manager receives the signal and may compute the return link timing offset and then responds with a RAR including $N_{1A}$ 212. Applying $N_{1A}$ 212 to the beam center timing 204 provides the UE with the transmit-timing offset 210. $N_{1B}$ 214 may be defined as the difference between the beam center timing 204 and the maximum timing offset 206. $N_{1B}$ 214 may be calculated as (Subframe_offset+Symbol_offset*16*Ts) multiplied by a number of frames 210, for example, 27 frames. The transmit-timing offset 210 may be calculated as $((N+28)-N_{1B}+N_{1A})$ when the maximum timing offset 206 is 28. In some embodiments, $N_{1B}$ 214 may be an offset broadcast in the SIB by the eNB.

In some embodiments, $N_{1B}$ 214 may be derived by satellite ephemeris in the UE. Applying $N_{1B}$ 214 to the maximum timing offset 206 provides the beam center timing reference 204 to the UE. In some embodiments, for example for GEO satellites, only the eNB or NB Manager may access or be provided the ephemeris to calculate the transmit-timing and frequency offsets. In some embodiments, for example MEO/LEO and HAP embodiments, the ephemeris may be encoded and broadcast as part of a System Information such that the UE can predictively compute its own timing and/or frequency offsets. The frequency offsets may be greater for a moving relay (such as LEO satellite, MEO satellite, or HAP), than a relatively stationary relay such as a GEO satellite.

Figure 3:
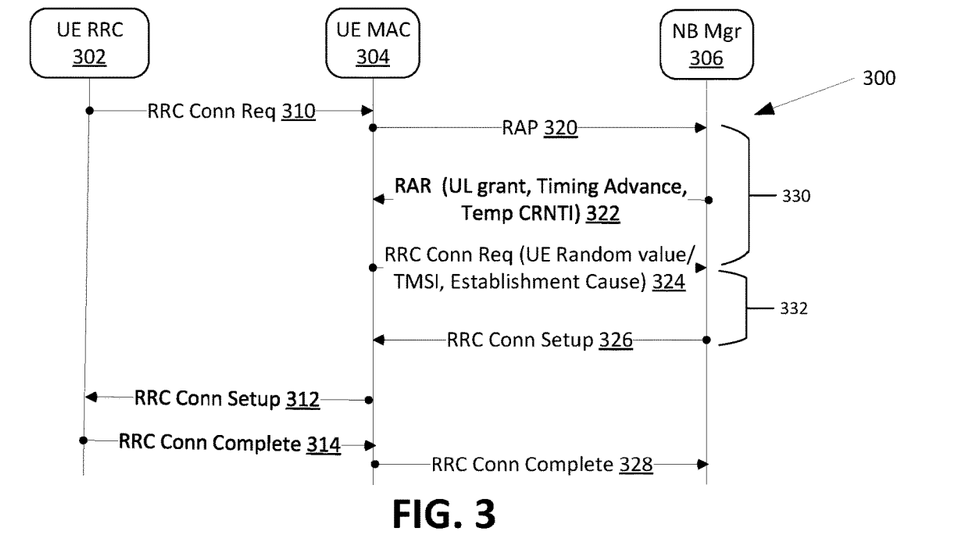
FIG. 3 illustrates random-access procedure for a satellite NB-IoT system according to various embodiments.

FIG. 3 illustrates random-access procedure for a satellite NB-IoT system according to various embodiments.

FIG. 3 illustrates random-access procedure 300 for a UE. The UE may include a UE RRC layer 302 and a UE MAC layer 304, both of which may communicate with a NB manager 306. The UE RRC 302 may send an RRC connection request 310 to the UE MAC layer 304. Subsequently the UE MAC layer 304 may send a random-access preamble message 322 the NB manager 306. The NB manager 306 may respond with a random-access response. After receiving the random-access response, the UE MAC layer 304 may forward an RRC connection request 324 to the NB manager 306.

Subsequent to the RRC connection request 324, the NB manager 306 may send an RRC connection setup request 326 to the UE MAC layer 304, which request is forwarded the UE RRC layer 302 as RRC connection setup request 312. When a connection setup is complete, the UE RRC layer 302 may send the RRC connection complete 314 to the UE MAC layer 304 to be forwarded to the NB manager 306 as an RRC connection complete request 328. The duration 330 between when the UE MAC layer 304 sends the RAP 320 and sends the RRC connection setup request 324 is the RAR window. The duration 332 between when the UE MAC layer 304 sends the RRC connection setup request 324 and receives the RRC connection setup response 326 is the contention resolution.

In some embodiments, initial system access or prior to transmission of a random-access preamble (RAP), a UE may pre-adjust transmit-timing and frequency to align with the satellite beam center timing and frequency. In some embodiments, satellite beam center timing and frequency (based on satellite ephemeris) may be broadcast in an optional System Information Block, for example, a SIB2-NB block including MAC configuration parameters. In exemplary embodiments, the Random-Access Response (RAR) may include a timing and frequency correction in the updated response message. In exemplary embodiments, an eNodeB may generate or provide the RAR and response messages. The timing and frequency correction may include a delta to the pre-corrected beam center timing to the UE's location within the beam. An updated timing advance command may be provided to provide additional bits to encode the further timing offset.

Prior art NB-IoT uses a Hybrid ARQ (HARQ) operation. The NB-IoT limits a UE to a 2 HARQ process ID per link direction (2 for the downlink and 2 for the uplink). The HARQ utilizes a stop-and-wait ARQ and therefore a maximum of two Media Access Control (MAC) Packet Data Units (PDUs) can be outstanding in each direction. The HARQ restricts the UE throughput to approximately 1 kbps uplink (UL)/1 kbps downlink (DL). In contrast, satellite NB-IoT may increase throughput by disabling the MAC HARQ that may reduce link margin by approximately 2 dB. Instead of MAC HARQ, RLC ARQ is used. RLC ARQ still guarantees reliable transmission for RLC-AM, and its throughput is restricted by the RLC ARQ transmission window size. Removal of HARQ may not affect use of 2048 DL repetitions/128 UL repetitions in satellite NB-IoT.

A GEO satellite may orbit at 35786 km above earth with a minimum RTT of about 480 ms. A GEO satellite has diurnal movement (non-stationary). L-band radio frequency (RF) signals may have a maximum Doppler shift of +/−264 Hz downlink and +/−282 Hz uplink. As such, the timing offset may also change with satellite distance from earth (240-280 ms for single hop).

In exemplary embodiments, modifications may be made to a MIB-NB and SIB-NB. For example, a new field in the MIB-NB may indicate a system type to delineate between the terrestrial and satellite system variants. The UE may use this field to automatically detect the system type to synchronize and to act accordingly. The UE may use this field to aid in cell selection and/or beam selection. The UE may use this field to determine and filter whether the particular system is compatible with the UE's capabilities and features. When the UE is capable of operating on both systems, the UE may dynamically adjust operation for the system type. When the UE does not support the system type, the UE may exclude the frequency with the unsupported type from further cell selection.

To assist with a tuning of system access timers, the SIB2-NB may include a Random-Access Response Window Size field or a MAC Contention Resolution Timer. The RA Response Window may indicate the duration that a UE will wait for a RAR from the eNodeB. In some embodiments, the RA Response Window may be set to a 2-10 ms duration by default or when omitted. The MAC Contention Resolution Timer used for the RACH contention resolution procedure may be set as 8-64 ms in range by default or if omitted. The RA Response Window timer may be started once the Connection Request is generated and as such, the UE may look for the corresponding UE Random value received in a MAC control element up to the expiry. For satellite NB-IoT, the enumerated or default values may be tuned for satellite RTT. Similarly, the satellite NB-IoT may expand the Timing Advance MAC Command to provide a larger range to account for satellite timing offset. Moreover, a frequency Correction MAC Command may be provided to send a frequency correction to account for a Doppler error due to the satellite and UE movement.

In an exemplary embodiment, additional fields may be provided to compute the beam center timing in SIB2-NB. The UE may receive SIB2-NB and align timing to the beam center before RAP transmission. The SIB2-NB field SB_SUBFRAME_OFFSET may provide a number of subframe (1 ms) offsets that may range from 0-50, for example, by using 6 bits. The SIB2-NB field SB_SYMBOL_OFFSET may provide an additional symbol offset, range from 0-1920, for example, by using 11 bits. The SB_SUBFRAME_OFFSET may be multiplied by 16*Ts where Ts is the sampling interval that depends on the subcarrier spacing, for example, 15 kHz or 3.75 kHz. As such, the additional fields provide beam center timing adjustments that have a total calculated range from 0-51 ms in 16*Ts units.

With reference to FIG. 2, the calculation of the UE transmit synchronization to an eNB return link timing for a GEO satellite system equals a base timing of 28 frames (280 ms) minus the sum of SB_SUBFRAME_OFFSET+ SB_SYMBOL_OFFSET*16*Ts, where Ts is the sampling interval based on the subcarrier spacing. As such, a timing offset with range from 229-280 ms may be provided for a GEO satellite NB-IoT embodiment.

When a UE starts up, the UE may scan for an NB IOT synchronization signal on the available RF channels to locate a suitable satellite. After synchronizing the downlink timing with the NB IOT synchronization signal may be used to obtain a system information block, for example, the MIB-NB, SIB1-NB and other SIBn-NB blocks. After obtaining the necessary system information blocks, the UE may initiate a random-access procedure to establish a Radio Resource Control (RRC) connection with the cell.

An exemplary NB-IoT synchronization signal may be used for UE synchronization. The NB-IoT synchronization signal may use NPSS, NSSS, or NRS carriers. The NB-IoT synchronization signal may provide a physical cell ID. The NB IOT synchronization signal may be used to synchronize a downlink timing of the satellite beam.

The physical cell ID may be used to decode further channels being broadcast from a cell identified by the physical cell ID. In some embodiments a physical cell ID may remap to a satellite beam ID. Satellite beams may or may not overlap in land coverage. When satellite beams overlap in land coverage, frequency reuse of control carrier frequencies may be calculated based on satellite beam characteristics to ensure that a UE located in between two same frequency carriers has minimal negative effects, such as, signal integrity degradation, interference, data consistency.

To support operation over GEO satellite, before transmission of the RAP, the UE may align its transmit-timing to a forward link's timing and pre-correct its return frequency offset to that of the forward link's frequency. The RAR response may include a larger timing correction range, a frequency correction field, a redefinition of some timers to accommodate the longer propagation delay over the satellite, proposed timing and frequency correction synchronization parameters to accommodate any relative movement between the satellite and the UE, and disable HARQ to permit more than 2 MAC PDUs to be outstanding in both DL/UL directions.

In some embodiments, before transmission of a Random-Access Preamble (RAP), the UE may pre-adjust a transmit-timing to align with the satellite beam center timing. In exemplary embodiments, the satellite NB-IoT system may restrict a timing offset from beam center to −17 ms to +17 ms. The satellite beam center timing may be transmitted in one of the optional System Information Blocks, for example, the SIB2-NB which contains the MAC configuration parameters. In the Random-Access Response (RAR), the eNodeB may provide a further timing correction in the updated timing advance command. The further timing correction may be a delta to the pre-corrected beam center timing to the UE's location within the beam. The updated timing advance command may be augmented with additional bits to encode the further timing offset.

To synchronize a UE transmitter in frequency, the UE may pre-compensate with a compensation value that is twice the downlink beam center Doppler due to satellite motion. The compensation value may be determined as per FIG. 5. This compensation value is transmitted from a NB manager as part of a SIB. When the compensation received by the UE in the SIB, for example, SIB2-NB, the UE applies this compensation value prior to a RAP transmission. Upon reception of the RAP, the NB manager may compute a round trip differential Doppler relative to the beam center and provide this in the RAR as a frequency offset. The UE applies the frequency offset received from the NB manager to all future transmissions. In exemplary embodiments, a frequency offset field may be included in the SIB2-NB system information block. The frequency offset may be provided in 2's complement form in units of 5 Hz ranging, for example, −640 Hz to +635 Hz.

Upon reception of the random-access preamble from the UE, a NB manager may compute further timing offset to account for the UEs location within the beam. Depending on the UEs location within the beam a distance between the satellite and the UE may change. The timing offset may also account for aspects of a satellite Doppler shift. In exemplary embodiments the NB manager may encode the timing offset defined timing advance command field of the random-access response. The UE applies the further timing offset received from the NB manager to all future transmissions.

For satellite NB-IoT a UE a frequency offset correction is provided to account for Doppler introduced by the user plus an additional margin, for example, ranging up to +/−1500 Hz. In exemplary embodiments, a signed 12-bit field may be included in the RAR in a SIB to encode the range of the frequency offset. Terrestrial NB-IoT does not provide a frequency correction. The frequency offset may be computed per FIG. 4.

Figure 4:
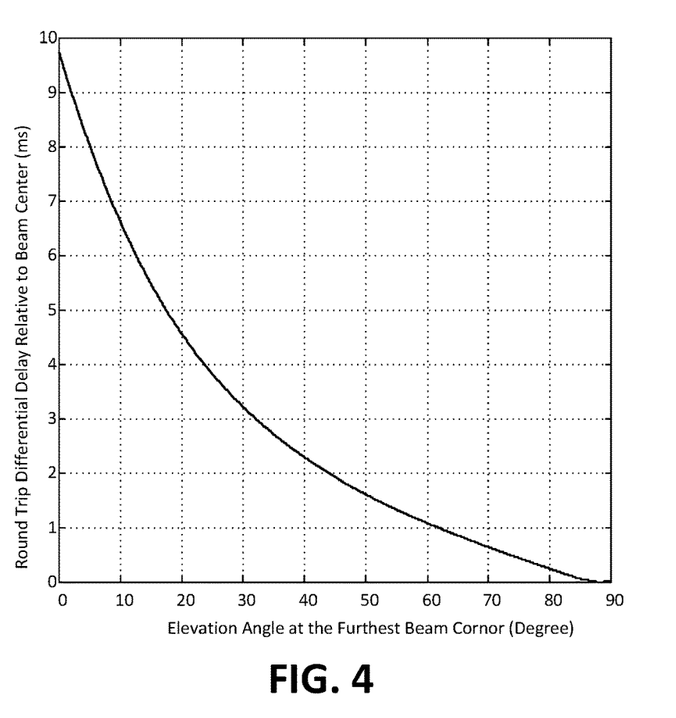
FIG. 4 illustrates a maximum round-trip differential delay within a satellite spot beam for a geosynchronous satellite according to various embodiments.

FIG. 4 illustrates a maximum round-trip differential delay within a satellite spot beam for a geosynchronous satellite according to various embodiments.

FIG. 4 illustrates a relationship between a round-trip differential delay relative to a beam center in milliseconds plotted against an elevation angle at the furthest beam corner. A nominal beam width of 0.7° and a beam width extension due to a beam pointing error plus beam selection error of 50% are assumed.

Figure 5:
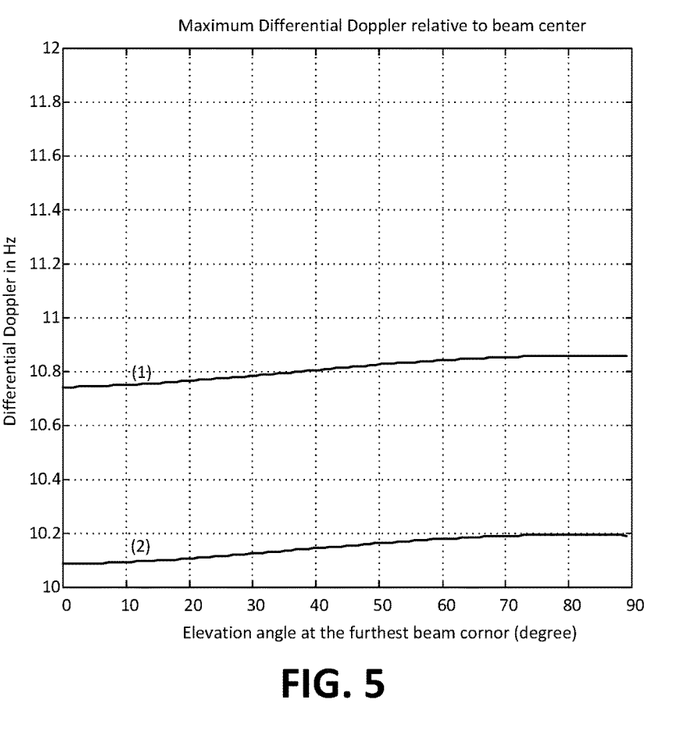
FIG. 5 illustrates a maximum differential Doppler for a stationary UE on a beam edge according to various embodiments.

FIG. 5 illustrates a maximum differential Doppler for a stationary UE on a beam edge according to various embodiments.

FIG. 5 illustrates a relationship between a differential Doppler in Hertz plotted against an elevation angle at the furthest corner. A nominal beam width of 0.7°, a beam width extension due to a beam pointing error plus beam selection error of 50%, and a satellite inclination of 6.28 degrees are assumed. Line (1) plots an uplink (return link) carrier frequency of 1.6605 GHz. Line (2) plots a downlink (forward link) carrier frequency of 1.5590 GHz.

Figure 6A:
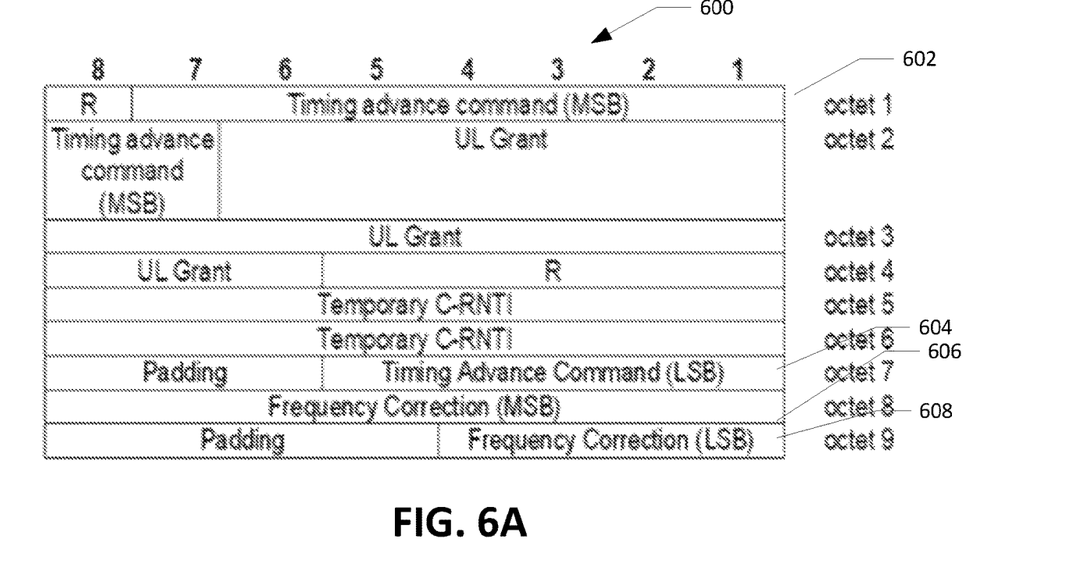
FIG. 6A illustrates a random-access response format according to various embodiments.

FIG. 6A illustrates a random-access response format according to various embodiments.

FIG. 6A illustrates a random-access response format 600 spanning 9-octets. A timing advance command may include a standard conforming octet 602 augmented by an expansion octet 604 to provide a timing advance command of 16 bits. A frequency correction may be provided by octet 606 and octet 608. The frequency correction may use 12-bits. The random-access response format 600 may be compatible with terrestrial NB-IoT.

Figure 6B:
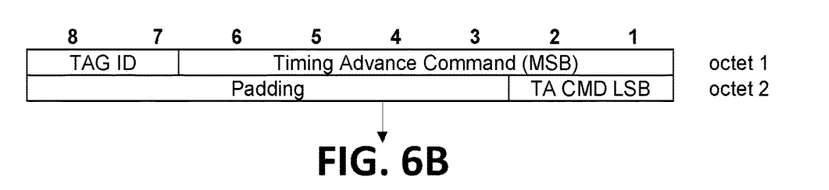
FIG. 6B illustrates a timing adjustment command format according to various embodiments.

FIG. 6B illustrates a timing adjustment command format according to various embodiments.

A timing adjustment may be sent from the NB manager to the UE in satellite NB-IoT. To support satellite NB-IoT, a timing correction message may be provided by the network. In exemplary embodiments, the range of the timing adjustment ($T_A$) may be at a minimum from +/−34 microseconds (us) or a of minimum 8 bits. The UE may adjust the timing per: $N_{TA,new}=N_{TA,old}+(T_A-64)*16$. The timing adjustment may be compatible with the NB-IoT in a manner similar to the RAR modification.

Figure 6C:
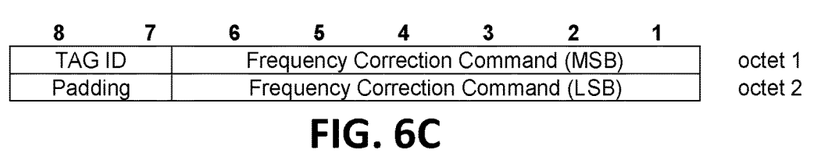
FIG. 6C illustrates a frequency correction command format according to various embodiments.

FIG. 6C illustrates a frequency correction command format according to various embodiments.

A frequency correction may be sent from the NB manager to the UE in satellite NB-IoT. The correction may account for Doppler shift from satellite, oscillator error and user movement. There is no existing frequency correction MAC control element in terrestrial NB-IoT for the uplink. A new MAC control element for frequency correction may be added. In exemplary embodiments, a correction range from −2048 Hz to +2047 Hz may be supported using for example, 12 bits minimum. In exemplary embodiments, a frequency correction may be calculated as: Frequency Correction (Hz)=$(F_C-2048)$.

In exemplary embodiments, a MIB-NB is received after NPSS and NSSS signals have been synchronized. The MIB-NB may provide: a Hyper system frame number (2 LSB); a System frame number (4 MSB); SIB1-NB scheduling information; NB-IoT Operational mode (In-band, guard band, standalone). There are 11 spare bits available for future extension. In some embodiments, the spare bits may be used support an additional system type field in MIB-NB to indicate use of NB-IoT over MSS, GEO, LEO or MEO satellites, or a HAP. At a minimum a single-bit may be used, where 0=nominal (3GPP NB-IoT) and 1=NB-IoT over MSS. This allows a UE to detect the system type and exclude incompatible systems from operation during cell selection or beam selection before receiving further SIBs. In some embodiments, a satellite or hybrid UE may detect a system type and configure oneself for operation on the appropriate system type.

In some embodiments, a single Mobile Management (MM) procedure can require multiple round trip. For example, a T3411 has a default 10 s value for awaiting an ATTACH ACCEPT after an ATTACH REQUEST is sent. To receive the ATTACH ACCEPT, the network must perform additional security and identity procedures, which may need multiple RT message procedures. As such, in some embodiments the default value of 10 s is too short and may be expanded accordingly.

Figure 7:
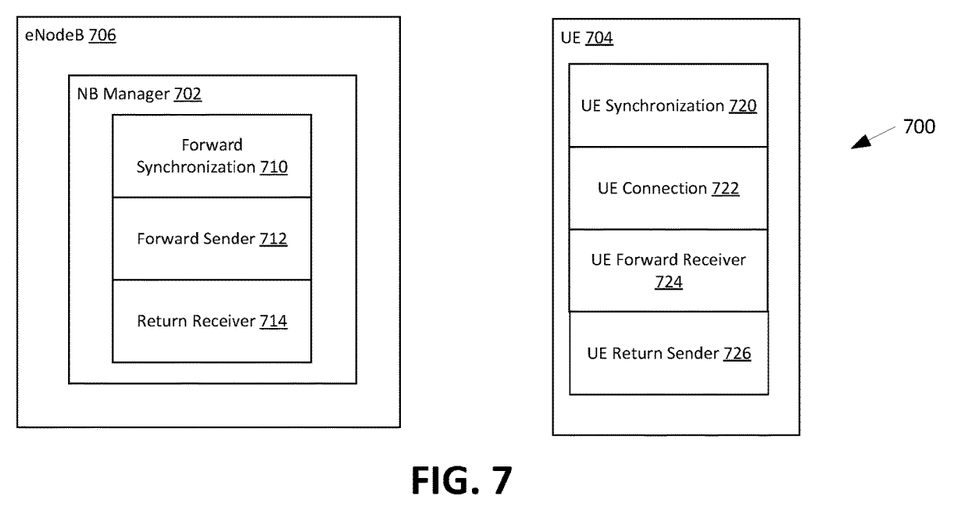
FIG. 7 illustrates a logical diagram of a low-power wide-area network system including a UE and a NB manager according to various embodiments.

FIG. 7 illustrates a logical diagram of a low-power wide-area network system including a UE and a NB manager according to various embodiments.

A system 700 may include an eNodeB 706 to communicate with an NE 704 via a satellite (not shown). The eNodeB 706 may include an NB manager 702. In some embodiments, the NB manager 702 may be disposed at a gateway site that is remote from the eNodeB 706. In such embodiments, the NB manager 702 at the gateway site may be connected via a high-speed, low latency terrestrial network (not shown) to the eNodeB 706 that has been disposed remote from the gateway site. In some embodiments, the eNodeB 706 may include an NB manager 702. The gateway site may include a site where a gateway antenna (not shown) is disposed.

The NB manager 702 may include a forward synchronization module 710 to generate and send a synchronization signal. The forward synchronization module 710 may provide timing and/or frequency corrections to the UE 704 as part of connection establishment over an RF signal, for example, with an RRC layer using a RAP. The forward synchronization module 710 may provide further timing and/or frequency corrections to the UE 704 as part of a continued use of an established connection over an RF signal, for example, with a system information block. The NB manager 702 may include a forward sender module 712 to send information from the NB manager 710 to the UE 704, for example, via a NB-IoT downlink. In some embodiments, the information may be packetized for transmission. The NB manager 702 may include a return receiver module 714 to receive information from the UE 704, for example, via a NB-IoT uplink.

The UE 704 may include a UE synchronization module 720 to align a transmit-timing and a transmit-frequency with a timing and frequency of the return link. The return link may be provided by a satellite or HAP beam. The UE synchronization module 720 may provide corrections to the transmit-timing and/or a frequency shift during connection establishment and use. The UE synchronization module 720 may obtain a transmit-timing offset. The UE synchronization module 720 may obtain a transmit-timing frequency. The UE synchronization module 720 may pre-adjust a transmit-timing and/or a transmit-frequency with respective offsets prior to a transmitting via the return link. The UE 704 may include a UE connection module 722 to establish a connection with the NB manager 702. The UE connection module 722 may send a RAP to initiate the connection. The UE connection module 722 may receive a RAR to complete a setup of the connection. The UE connection module 722 may process a further timing correction and a further frequency correction included in the RAR. The UE 704 may include a UE forward receiver module 724 to receive information from the NB manager 710. In some embodiments, the information may be packetized for transmission. The UE 704 may include a UE return sender module 726 to send information from the UE 704 to the eNodeB 706 or the NB manager 702.

Figure 8:
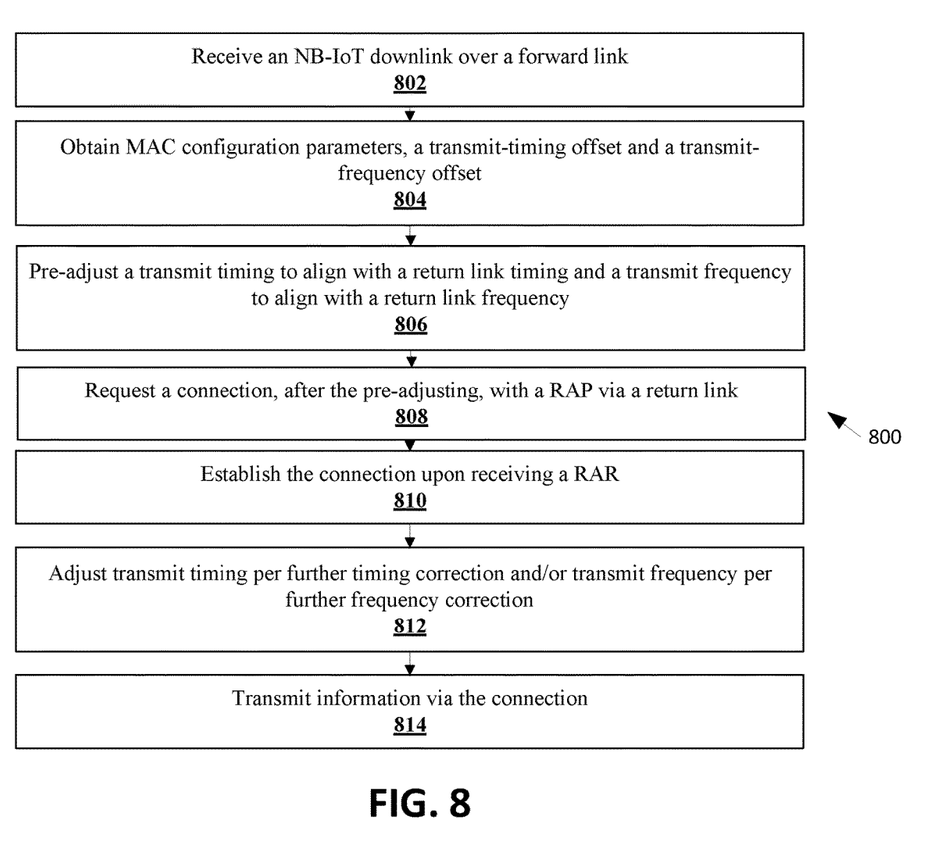
FIG. 8 illustrates a method of providing a low-power wide-area network according to various embodiments.

FIG. 8 illustrates a method of providing a low-power wide-area network according to various embodiments.

A method 800 may provide a low-power wide-area network. The method 800 may include operation 802 to receive a Narrowband Internet of things (NB-IoT) downlink over a forward link, for example, a forward link of a GEO satellite. The method 800 may further include operation 804 to obtain MAC configuration parameters, a transmit-timing offset and a transmit-frequency offset. In some embodiments, operation 804 may obtain its information via the forward link, for example, via a system information block, an NB-IoT command, a NB-IoT synchronization signal included in the forward link, or the line. In some embodiments, operation 804 may calculate the transmit timing offset and/or the timing frequency offset based on a UE location and ephemeris of the relay (satellite, HAP or the like).

The method 800 may further include operation 806 to pre-adjust a transmit timing to align with a return link timing and a transmit frequency to align with a return link frequency. Operation 806 may use the transmit timing offset and the transmit frequency offset provided by operation 804 to perform the pre-adjustment.

The method 800 may further include operation 808 to request a connection, based on the MAC configuration parameters and after the pre-adjusting, with a Random-Access Preamble (RAP) via the return link, for example, a return link of a GEO satellite. Operation 808 may update various random-access timers associated with the RAP based on the RTT.

The method 800 may further include operation 810 to adjust the transmit-timing per a further timing correction and/or the transmit-frequency per a further frequency correction.

The method 800 may further include operation 814 to transmit information (payload) via the return link after operation 812. Operation 814 may convey information from a UE to a NB manager via an NB-IoT uplink included in the return link.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for providing a Narrowband Internet of Things (NB-IoT) network, the method comprising:
   receiving an NB-IoT downlink over a forward link;
   obtaining MAC configuration parameters, a transmit-timing offset and a transmit-frequency offset;
   pre-adjusting, to align with a return link timing and a return link frequency, a transmit-timing with the transmit-timing offset and a transmit-frequency with the transmit-frequency offset;
   requesting a connection, based on the MAC configuration parameters and after the pre-adjusting, with a Random-Access Preamble (RAP) over an NB-IoT uplink via the return link; and
   establishing the connection upon receiving a random-access response (RAR),
   wherein a Round Trip-Time (RTT) from a transmitting antenna to a receiving antenna is greater than 67 microseconds (us), and
   both the NB-IoT downlink and the NB-IoT uplink use a mostly unchanged NB-IoT standard waveform.

2. The method of claim 1, wherein the RAR comprises a further timing correction and a further frequency correction, and the establishing comprises adjusting the transmit-timing with the further timing correction and the transmit-frequency with the further frequency correction.

3. The method of claim 1, further comprising adjusting the transmit-timing with a further timing correction upon receiving a timing advance command.

4. The method of claim 1, further comprising adjusting the transmit-frequency with a further frequency correction upon receiving a frequency correction command.

5. The method of claim 1, wherein the obtaining comprises calculating the transmit-timing offset and the transmit-frequency offset based on a User Equipment location and ephemeris of a satellite or a High-Altitude Platform.

6. The method of claim 1, wherein the obtaining comprises calculating the transmit-frequency offset based on a frequency Doppler shift.

7. The method of claim 1, wherein the NB-IoT downlink comprises the transmit-timing offset and the transmit-frequency offset.

8. The method of claim 1, wherein the RTT is greater than 1 millisecond (ms).

9. The method of claim 1, wherein the forward link and the return link are relayed by a satellite or a High-Altitude Platform.

10. The method of claim 1, further comprising updating random-access timers associated with the RAP based on the RTT.

11. The method of claim 1, further comprising updating random-access timers associated with the RAP based on the RTT,
    wherein the RAR comprises a further timing correction and a further frequency correction,
    the establishing comprises adjusting the transmit-timing with the further timing correction and the transmit-frequency with the further frequency correction,
    the RTT is greater than 1 millisecond (ms),
    the forward link and the return link are relayed by a satellite or a High-Altitude Platform, and
    the MAC configuration parameters comprise one or more of a random-access response window size, a MAC contention resolution timer, a system type, the transmit-timing offset, or the transmit-frequency offset.

12. The method of claim 1, further comprising disabling a MAC HARQ protocol for the connection.

13. A User Equipment (UE) to communicate via a Narrowband Internet of Things (NB-IoT) network, the UE comprising:
- a UE forward receiver module to receive an NB-IoT downlink over a forward link;
- a UE synchronization module
  - to obtain MAC configuration parameters, a transmit-timing offset and a transmit-frequency offset, and
  - to pre-adjust, to align with a return link timing and a return link frequency, a transmit-timing with the transmit-timing offset and a transmit-frequency with the transmit-frequency offset; and
- a UE connection module
  - to request, based on the MAC configuration parameters and after the pre-adjusting, a connection with a Random-Access Preamble (RAP) over an NB-IoT uplink via the return link, and
  - to establish the connection upon receiving a random-access response (RAR),
- wherein a Round Trip-Time (RTT) from a transmitting antenna to a receiving antenna is greater than 67 microseconds (us),
- the forward link and the return link are relayed by a satellite or a High-Altitude Platform, and
- both the NB-IoT downlink and the NB-IoT uplink use a mostly unchanged NB-IoT standard waveform.

14. The UE of claim 13, wherein the RAR comprises a further timing correction and a further frequency correction, and the UE connection module further adjusts the transmit-timing with the further timing correction and the transmit-frequency with the further frequency correction.

15. The UE of claim 13, wherein the UE connection module is configured to adjust the transmit-timing with a further timing correction upon receiving a timing advance command.

16. The UE of claim 13, wherein the UE connection module is configured to adjust the transmit-frequency with a further frequency correction upon receiving a frequency correction command.

17. The UE of claim 13, wherein the UE connection module is configured to calculate the transmit-timing offset and the transmit-frequency offset based on a User Equipment location and ephemeris of the satellite or the High-Altitude Platform.

18. The UE of claim 13, wherein the NB-IoT downlink comprises the transmit-timing offset and the transmit-frequency offset.

19. The UE of claim 13, wherein the forward link and the return link are relayed by a satellite or a High-Altitude Platform.

20. The UE of claim 13, wherein the UE connection module is configured to update random-access timers associated with the RAP based on the RTT,
- the RAR comprises a further timing correction and a further frequency correction,
- the UE connection module is configured to adjust the transmit-timing with the further timing correction and the transmit-frequency with the further frequency correction,
- the RTT is greater than 1 millisecond (ms),
- the forward link and the return link are relayed by a satellite or a High-Altitude Platform, and
- the MAC configuration parameters comprise one or more of a random-access response window size, a MAC contention resolution timer, a system type, the transmit-timing offset, or the transmit-frequency offset.

* * * * *